(12) United States Patent
Hu et al.

(10) Patent No.: US 10,816,200 B2
(45) Date of Patent: Oct. 27, 2020

(54) COMBUSTOR HEAT SHIELD WITH CARBON AVOIDANCE FEATURE

(71) Applicant: PRATT & WHITNEY CANADA CORP., Longueuil (CA)

(72) Inventors: Tin Cheung John Hu, Markham (CA); Robert Sze, Mississauga (CA); Honza Stastny, Georgetown (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 203 days.

(21) Appl. No.: 15/346,060

(22) Filed: Nov. 8, 2016

(65) Prior Publication Data
US 2017/0051918 A1    Feb. 23, 2017

Related U.S. Application Data

(62) Division of application No. 13/790,451, filed on Mar. 8, 2013, now Pat. No. 9,518,739.

(51) Int. Cl.
| | |
|---|---|
| *F23R 3/06* | (2006.01) |
| *F23R 3/04* | (2006.01) |
| *F23R 3/00* | (2006.01) |
| *F23R 3/10* | (2006.01) |

(52) U.S. Cl.
CPC ............. *F23R 3/04* (2013.01); *F23R 3/002* (2013.01); *F23R 3/005* (2013.01); *F23R 3/007* (2013.01); *F23R 3/06* (2013.01); *F23R 3/10* (2013.01); *F23R 2900/00004* (2013.01); *F23R 2900/03041* (2013.01); *F23R 2900/03044* (2013.01); *F23R 2900/03045* (2013.01); *Y02E 20/344* (2013.01)

(58) Field of Classification Search
CPC ...... F23R 3/04; F23R 3/06; F23R 3/10; F23R 2900/03041; F23R 3/286; F23R 2900/03044; F23R 2900/03042; F23R 3/002; F23M 5/085
See application file for complete search history.

(56) References Cited

U.S. PATENT DOCUMENTS

| | | | |
|---|---|---|---|
| 2,907,171 A | 10/1959 | Alf Lysholm | |
| 3,751,911 A | 8/1973 | De Tartaglia | |
| 3,777,484 A | 12/1973 | Dibelius et al. | |
| 4,155,220 A | 5/1979 | Emory | |
| 4,312,186 A | 1/1982 | Reider | |
| 4,695,247 A | 9/1987 | Enzaki et al. | |
| 4,930,306 A * | 6/1990 | Shekleton | F23R 3/04 60/756 |

(Continued)

FOREIGN PATENT DOCUMENTS

| | | |
|---|---|---|
| CA | 2610263 | 5/2008 |
| WO | WO89/11588 | 11/1989 |

OTHER PUBLICATIONS

Extended European Search Report for EP Application No. 14158115.7 dated Sep. 21, 2015.

*Primary Examiner* — Gerald L Sung
*Assistant Examiner* — Rene D Ford
(74) *Attorney, Agent, or Firm* — Norton Rose Fulbright Canada LLP

(57) ABSTRACT

The build-up of carbon deposition on the front face of a combustor heat shield is discouraged by jetting air out from the front face of the heat shield with sufficient momentum to push approaching fuel droplets or rich fuel-air mixture way from the heat shield.

6 Claims, 3 Drawing Sheets

(56) References Cited

U.S. PATENT DOCUMENTS

| | | |
|---|---|---|
| 4,944,152 A | 7/1990 | Shekleton |
| 5,127,221 A | 7/1992 | Beebe |
| 5,363,644 A | 11/1994 | Shekleton et al. |
| 5,396,759 A | 3/1995 | Richardson |
| 5,598,697 A | 2/1997 | Ambrogi et al. |
| 5,758,504 A | 6/1998 | Abreu et al. |
| 6,101,814 A | 8/2000 | Hoke et al. |
| 6,868,675 B1 | 3/2005 | Kuhn et al. |
| 7,389,643 B2 | 6/2008 | Simons et al. |
| 7,712,314 B1 | 5/2010 | Barnes et al. |
| 8,495,881 B2 | 7/2013 | Edwards et al. |
| 2005/0217276 A1 | 10/2005 | Colibaba-Evulet et al. |
| 2007/0125093 A1 | 6/2007 | Burd et al. |
| 2007/0209366 A1 | 9/2007 | Gerendas et al. |
| 2009/0013530 A1* | 1/2009 | Rudrapatna ............. F23R 3/002  29/888 |
| 2010/0037620 A1 | 2/2010 | Chila |
| 2010/0095680 A1 | 4/2010 | Rudrapatna et al. |
| 2010/0272953 A1* | 10/2010 | Yankowich ............ F23M 5/085  428/138 |
| 2010/0300106 A1* | 12/2010 | Edwards .................. F23R 3/10  60/752 |
| 2011/0023495 A1 | 2/2011 | Bronson et al. |
| 2011/0185739 A1 | 8/2011 | Bronson et al. |
| 2012/0111014 A1 | 5/2012 | Beran et al. |
| 2012/0255308 A1* | 10/2012 | Chandler ............... F23R 3/002  60/754 |
| 2014/0250896 A1 | 9/2014 | Hu et al. |

\* cited by examiner

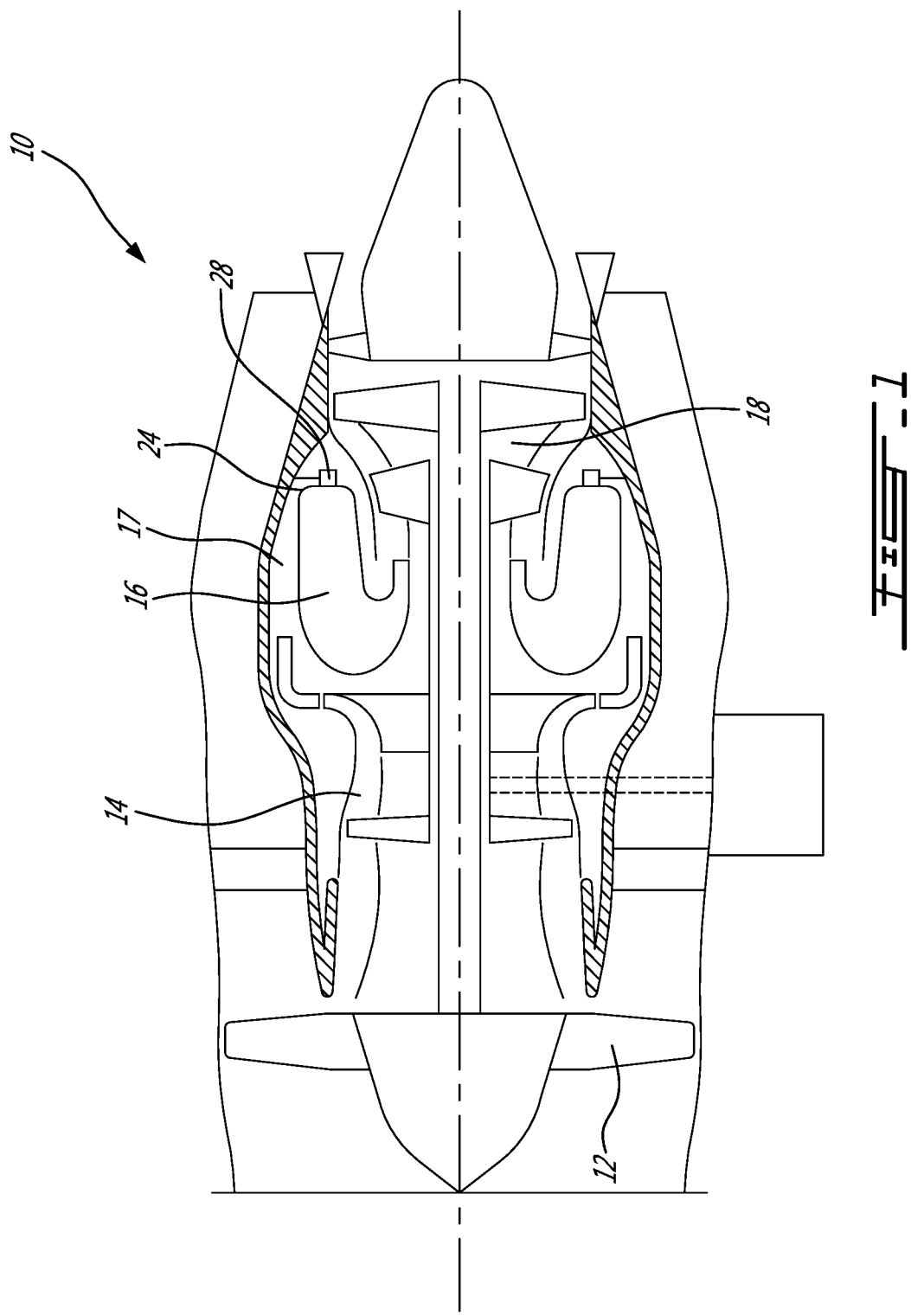

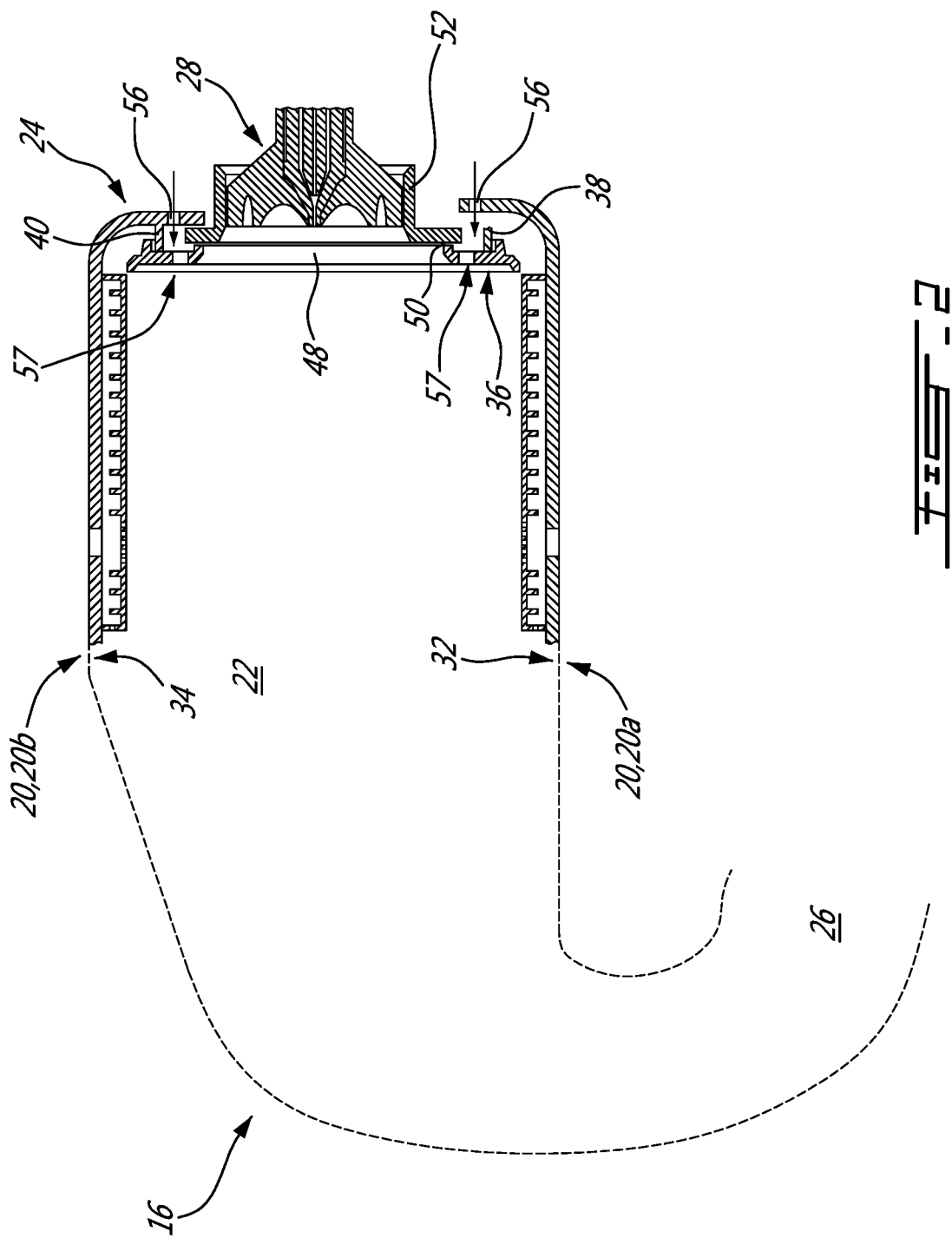

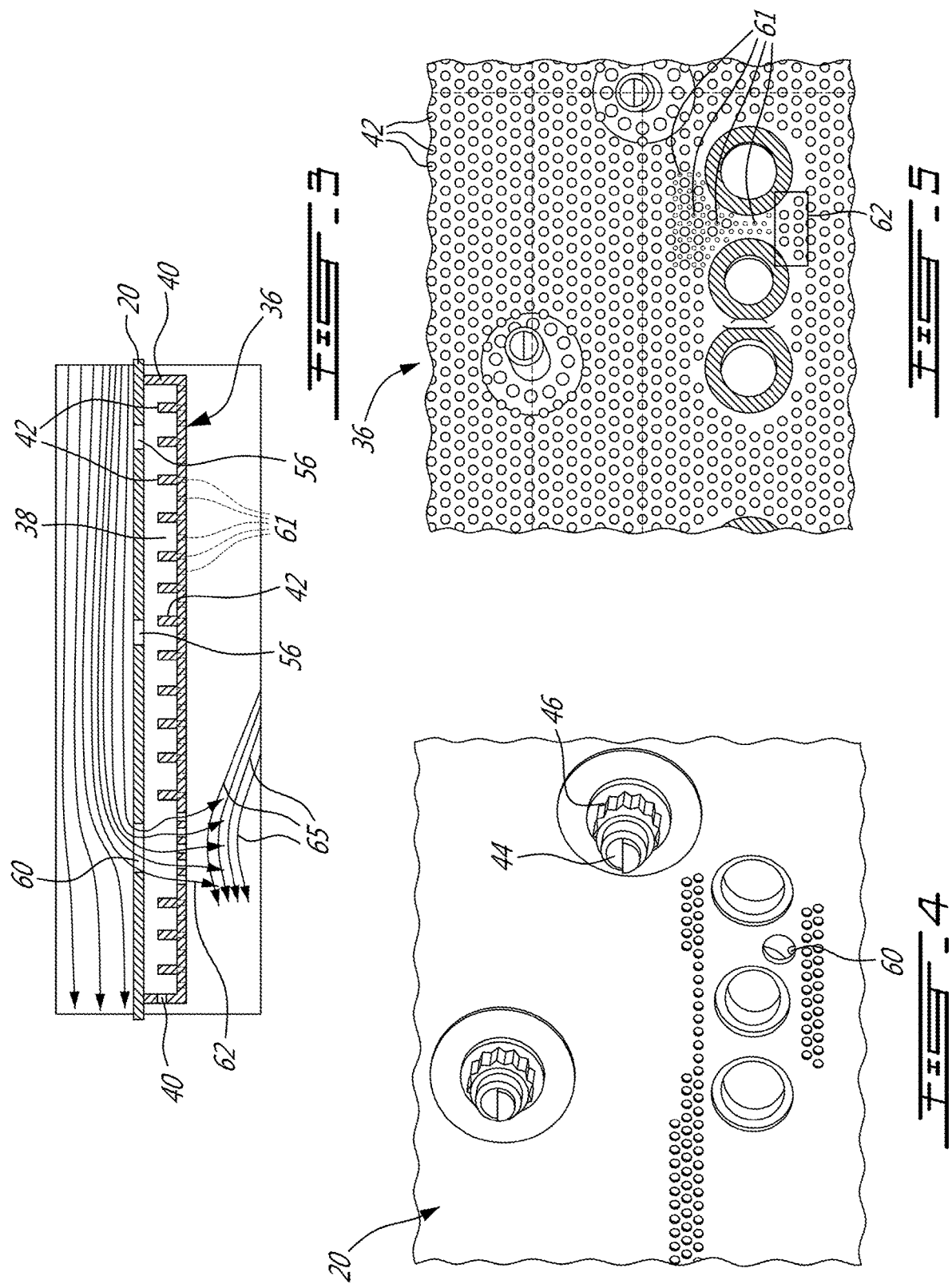

COMBUSTOR HEAT SHIELD WITH CARBON AVOIDANCE FEATURE

RELATED APPLICATIONS

This application is a divisional of U.S. patent application Ser. No. 13/790,451 filed on Mar. 8, 2013, the content of which is hereby incorporated by reference.

TECHNICAL FIELD

The application relates generally to gas turbine engines and, more particularly, to a combustor heat shield with carbon avoidance features.

BACKGROUND OF THE ART

Heat shields are widely used in gas turbine engine combustors to meet durability requirements. In small gas turbine engine combustors, carbon can build-up in the primary zone due to the close proximity of the combustor liner walls and heat shields to the fuel injectors. The accumulation of carbon residues on the front face of combustor heat shields require regular field maintenance interventions and may lead to engine performance issues if not properly removed.

SUMMARY

In one aspect, there is provided a gas turbine engine combustor comprising a combustor shell defining a combustion chamber; a heat shield mounted to an inner surface of the combustor shell, the heat shield having a back face facing the inner surface of the combustor shell and being spaced therefrom to define an air gap, the heat shield having localized areas on an opposed front face thereof where carbon residues tend to build-up during engine operation; and an airflow path extending along a generally straight line across the combustor shell, the air gap and the heat shield at each said localized areas; each airflow path comprising an impingement hole defined in the combustor shell and being disposed in-line with a group of carbon purge air holes defined in the heat shield, the impingement holes and the carbon purge air holes being sized to preserve enough air momentum at the exit of the purge air holes to deflect fuel droplets away from the front face of the heat shield, thereby discouraging carbon build-up on said front face.

In a second aspect, there is provided a method for discouraging build-up of carbon deposits on a front face of a combustor heat shield mounted inside a primary zone of a combustion chamber circumscribed by a combustor shell, the method comprising: aerodynamically pushing fuel droplets or rich fuel-air mixture away from a front face of the heat shield by jetting air out from the front face of the heat shield with enough momentum to counteract the fuel droplets or rich fuel-air mixture coming towards the front face of the heat shield.

DESCRIPTION OF THE DRAWINGS

Reference is now made to the accompanying figures, in which:

FIG. 1 is a schematic cross-sectional view of a turbofan gas turbine engine;

FIG. 2 is a schematic cross-sectional view of the combustor of the engine shown in FIG. 1;

FIG. 3 is an enlarged cross-sectional view illustrating the details of a carbon avoidance air flow path across the combustor shell and a combustor dome heat shield;

FIG. 4 is an enlarged view of a portion of the outer surface of the combustor shell illustrating an impingement hole defined in the combustor shell to feed a group of carbon purge air holes defined in the heat shield in order to push soot and/or fuel droplets away from the front face of the heat shield; and FIG. 5 is an enlarged plane view of a portion of the back face of the combustor heat shield and illustrating carbon purge air holes on the heat shield.

DETAILED DESCRIPTION

FIG. 1 illustrates a turbofan gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

The combustor 16 is housed in a plenum 17 supplied with high pressure air from the compressor 14. As shown in FIG. 2, the combustor 16 may comprise a reverse flow annular combustor shell 20 composed of a radially inner liner 20a and a radially outer liner 20b, defining an annular combustion chamber 22 therebetween. The combustor 16 has a bulkhead or inlet dome portion 24 and an opposed exit potion 26 for communicating combustion gases with the turbine section 18. A plurality of circumferentially distributed fuel nozzles 28 (only one shown in FIG. 2) are mounted to extend through the inlet dome portion 24 of the combustor 16 to deliver a fuel-air mixture to combustion chamber 22.

Inner and outer liners 20a and 20b may have any suitable configuration and, thus, are shown in dotted line only in FIG. 2. The inner and outer liners 20a and 20b are preferably made out of sheet metal, though any suitable material(s) and manufacturing method(s) may be used. A thermal barrier coating (not shown) may be applied to the inner or combustion facing surfaces 32, 34 of the liners 20a and 20b to protect them against the high temperatures prevailing in the combustion chamber 22. Small effusion holes (not shown) may also be defined in the inner and outer liners 20a and 20b for forming an air cooling film over the inner surface of liners 20a, 20b. Generally, the diameter of the effusion holes is selected to be smaller than the mean free path of the molecules in the gas to allow effusion to occur. Larger dilution holes (not shown) may also be defined in the liners 20a, 20b for combustion purposes. Dilution air may be used to provide a more uniform temperature profile in the combustor.

Additional thermal protection may be provided through the use of heat shields cast from high temperature materials. In the illustrated example, heat shields 36 (only one shown in FIG. 2) are mounted to the inner surface of the dome panel of the combustor shell 20. As shown in FIGS. 2 and 3, the back face (i.e. the face that faces away from the combustion chamber 22) of each heat shield 36 is spaced from the inner surface of the combustor shell 20 to define an air gap 38 for receiving cooling air. Rails 40 extend from the back face of the heat shield 36 in sealing engagement with the inner surface of the combustor shell 20 to seal the air gap 38. Heat exchange promoting structures 42, such as pin fins, pedestals, trip strips and/or divider walls may extend integrally from the back face of the heat shield 36 into the air gap 38 in order to further promote heat transfer from the heat shield 36 to the cooling air passing through the air gap 38. Threaded studs 44 (FIG. 4) may also extend from the back face of the heat shield 36 for mounting the same to the combustor shell 20. The threaded studs 44 may protrude through corresponding mounting holes in the combustor shell 20 for engagement with washers and self-locking nuts 46 (FIG. 4) on the outside of the combustor shell 20. Other fastening means could be used as well.

As shown in FIG. 2, in the case of a combustor dome heat shield, a central circular opening 48 may be defined in the heat shield 36 for receiving the fuel nozzle 28. The heat shield 36 may be provided on the back face thereof with an annular flat sealing shoulder 50 which extends about the central opening 48 for cooperating with a corresponding sealing surface on the front face of a floating collar 52 mounted about the head of the fuel nozzle 28. The floating collar 52 allows relative movement between the fuel nozzle 28 and the combustor shell 20 while minimizing leakage therebetween. In operation, the floating collar 52 is urged in sealing engagement with the annular sealing shoulder 50 of the heat shield 36 by the high pressure air fed into the plenum 17.

Additional holes are defined through the combustor shell 20 for directing cooling air into the air gap 38 in order to cool the heat shield 36. The back face of the heat shield 36 is generally cooled by means of impingement augmented by the use of the heat transfer promotion structures 42 provided at the back thereof. A combination of impingement and effusion cooling can also be used. As shown in FIGS. 2 and 3, a set of impingement cooling holes 56 may be defined through the dome portion of the combustor shell 20 to cause high pressure air from the plenum 17 to impinge upon the back face of the heat shield 36.

Film cooling may be used to cool down the front face of the heat shield 36. In this regard, small effusion holes 57 (FIG. 2) may be distributed over the surface of the heat shield for allowing air in the air gap 38 to transpire out from the front face of the heat shield 36, thereby providing for the formation of a film of low velocity air over the heat shield front face. In use, the air flowing through the impingement cooling holes 56 in the combustor shell 20 impinges upon the back face of the heat shield 36 and then flow through tortuous conductive paths defined by the heat promoting structures 42. Most of the cooling air flowing over the back face of the heat shield 36 will transpire through the heat shield effusion holes 57 to form a wide area of low velocity air at the front wall boundary layer of the heath shield. While this layer of low velocity air provides cooling on the front face of heat shield, it does not provide enough air momentum to prevent fuel droplets and/or rich fuel-air mixture discharged from the fuel nozzles 28 into the combustion chamber 22 from impinging upon certain surface areas at the front face of the heat shield 36. This may lead to carbon deposition problems.

Applicant has found that build-up of carbon deposits on the front face of combustor heat shields may be minimized or substantially prevented by locally providing high momentum air at targeted areas where fuel droplets or rich fuel-mixture impingement is subject to occur during engine operation. Proper utilization of the dynamic head in the air fed in the plenum 17 is needed to cross both the combustor shell and the heat shield and still have enough momentum on the front of the heat shield to aerodynamically push the fuel droplets approaching the front face of the heat shield.

As best shown in FIG. 3, a carbon purge airflow path may be locally provided across the combustor shell 20 and the heat shield 36 at each location where carbon deposition tends to occur. Each carbon purge airflow path is generally straight and as short as possible (by opposition to tortuous turbulent cooling airflow paths) in order to minimize air pressure losses and, thus, jetting air out of the front face of the heat shield 36 with sufficient velocity to divert the fuel droplets before they impinge upon the front face of the heat shield 36.

Each such carbon purge airflow path may comprise an impingement hole 60 (FIG. 4) defined in the combustor shell 20 generally in alignment with a corresponding groups of carbon purge air jet holes (the small holes in box 62 in FIG. 5 and hereinafter simply referred to as holes 62 FIG. 5) defined in the heat shield 36 directly in areas subject to carbon deposition build-up. It can be appreciated from FIG. 3, that the carbon purge jet holes 62 on the heat shield 36 are in very close proximity to the location of the impingement hole 60 on the combustor shell 36 (i.e. the hole 60 is directly on top of the carbon purge holes 62 to take advantage of the dynamic head), thereby minimizing air pressure losses. It can also be appreciated from FIG. 3 that a plurality of the carbon purge air holes 62 are disposed within the confines of the impingement jet directed by the impingement hole 60 on the back face of the heat shield 36 (there is a group of 8 carbon purge holes for one impingement hole in the embodiment shown in FIG. 5). In this way, impingement jets may be directly fed to the carbon purge air holes 62 with minimal pressure losses.

The impingement holes 60 and the carbon purge air holes 62 are sized to preserve enough air momentum at the exit of the purge air holes to push/deflect fuel droplets away from the front face of the heat shield 36, thereby discouraging carbon build-up on the heat shield front face. As shown in FIG. 4, the impingement hole 60 feeding the carbon purge holes 62 has a much larger cross-section than the impingement cooling holes 56. Also, as shown in FIG. 5, the carbon purge air holes 62 have a greater cross-section than the effusion holes 61 used to form a cooling film of low velocity air over the front face of the heat shield 36. The impingement or feed holes 60 to the carbon purge holes 62 may have an area ratio of 1 to 2. The feed hole 60 should be directly on top (i.e. directly aligned with) of the carbon purge holes 62 to take advantage of the dynamic head. According to one embodiment, the carbon purge holes 62 have a diameter ranging from about 0.03" to about 0.05" and the feed holes 60 have a diameter ranging from about 0.100" to about 0.200".

A local high combustor pressure drop (static+dynamic) may be realized with the above described arrangement to improve the air momentum at the exit of the carbon purge air holes 62 to dilute and discourage carbon build-up on the front face of the heat shield 36. Referring to FIG. 3, it can be seen that high pressure air from plenum 17 enters the large impingement hole 60 and flow directly across the air gap 38 to the carbon purge air holes 62 on the heat shield 36. The air is thus subject to low pressure losses between the plenum 17 and the carbon purge air holes 62. The air may thus be jetted out of the carbon purge air holes 62 with enough momentum to deviate the incoming flow of fuel droplets or rich fuel-air mixture depicted by flow arrows 65 in FIG. 3. In contrast, the cooling air flowing through the much smaller impingement holes 56 in the combustor shell 36 will impinge upon the back face of the heat shield 36 and then flow thereover between the flow promoting structures 42 before slowly transpiring through the small effusion holes 57 distributed over the surface of the heat shield 36. Impingement flow through the carbon purge holes 62 has much lower pressure loss across the aligned large impingement hole 60 and the jet holes 62, resulting in much higher flow velocity and lower air temperature due to little heat pick-up. As opposed to the cooling airflow paths, the carbon avoidance flow path is designed to be as straight as possible with little air flow surface contact to minimize pressure losses. The carbon avoidance flow path targets local specific area with high velocity and oxygen rich air supply that counteract liquid fuel droplet and fuel-rich gaseous mixture coming towards the front face of the heat shield. The high energy air jet pushes the droplets away from the front face of the heat shield and into the hot reaction primary zone of the combustion chamber with enough oxygen to react with the fuel pockets.

It is noted that the above described carbon avoidance features may be incorporated/retrofitted to existing heat shield construction. Conventional heat shield construction can be retained. Also conventional hole drilling and heat shield casting methods may be used to integrate the carbon avoidance features in heat shields. It is also pointed out that the carbon avoidance features may be provided at low cost since they only require additional holes in the combustor shell and heat shield. No other parts need to be introduced. Finally, avoiding carbon deposition build-up on the heat shields contributes to reduce field maintenance and direct operating costs. It provides for greater durability.

The above description is meant to be exemplary only, and one skilled in the art will recognize that changes may be made to the embodiments described without departing from the scope of the invention disclosed. It is also understood that various combinations of the features described above are contemplated. It is understood that carbon avoidance features may be applied to impingement and pin-finned, or impingement and effusion, or impingement with pin-finned and effusion heat shield configurations. Still other modifications which fall within the scope of the present invention will be apparent to those skilled in the art, in light of a review of this disclosure, and such modifications are intended to fall within the appended claims.

What is claimed is:

1. A method for discouraging build-up of carbon deposits on a front face of a combustor heat shield mounted inside a primary zone of a combustion chamber circumscribed by a combustor shell, the combustor heat shield having effusion holes configured to provide for the formation of a film of cooling air over the front face of the combustor heat shield, the combustor shell having a longitudinal axis and extending longitudinally from a bulkhead to which fuel nozzles are mounted to deliver a fuel-air mixture to the combustion chamber, the combustor heat shield lining the combustor shell, the method comprising: aerodynamically pushing fuel droplets or rich fuel-air mixture away from the front face of the combustor heat shield by jetting air out from the front face of the combustor heat shield in a direction transversal to the longitudinal axis and with enough momentum to counteract the fuel droplets or rich fuel-air mixture coming towards the front face of the combustor heat shield, including directing air impingement jets to a group of air jet holes defined in the heat shield at localized areas where carbon deposition tends to occur, the group of air jet holes being disposed directly under an impingement hole defined in the combustor shell so that an axial projection of the impingement hole onto the back face of the combustor heat shield captures the group of air jet holes, wherein the air jet holes have a greater cross-section area than the effusion holes.

2. The method defined in claim 1, further comprising sealing on opposed sides of the group of air jet holes between the combustor heat shield and the combustor shell.

3. The method defined in claim 2, wherein the air impingement hole and the air jet holes have parallel axes normal to the front face of the combustor heat shield.

4. The method defined in claim 3, comprising sizing the impingement hole on the combustor shell and the group of air jet holes on the heat shield to preserve enough air momentum at the exit of the air jet holes to deflect liquid fuel droplets away from the front face of the heat shield.

5. The method defined in claim 3, comprising drilling the impingement hole and the air jet holes in addition to existing impingement cooling holes and effusion holes respectively present on the combustor shell and the heat shield.

6. The method defined in claim 3, wherein the impingement hole and the air jet holes are retrofitted on an existing combustor shell and heat shields.

* * * * *